United States Patent
Sharp

[15] 3,663,068
[45] May 16, 1972

[54] ANTI-LOCK BRAKE SYSTEMS

[72] Inventor: Denis Sharp, Sussex, England
[73] Assignee: U.S. Philips Corporation, N.Y., N.Y.
[22] Filed: Dec. 14, 1970
[21] Appl. No.: 98,159

Related U.S. Application Data

[63] Continuation of Ser. No. 771,591, Oct. 29, 1968, abandoned.

[30] Foreign Application Priority Data

Nov. 1, 1967 Great Britain.....................49,705/67

[52] U.S. Cl.........................................................303/21 F
[51] Int. Cl. .......................................................B60t 8/06
[58] Field of Search......................303/6, 21, 61, 62, 63, 21 F

[56] References Cited

UNITED STATES PATENTS

| | | |
|---|---|---|
| 3,306,677 | 2/1967 | Dewar et al.............................303/21 |
| 3,403,945 | 10/1968 | Dewar et al.............................303/21 |
| 3,415,577 | 12/1968 | Walker....................................303/21 |
| 3,486,800 | 12/1969 | Ayers, Jr.................................303/21 |
| 3,495,882 | 2/1970 | Stelzer....................................303/21 |

Primary Examiner—Edward A. Sroka
Assistant Examiner—Hadd S. Lane
Attorney—Frank R. Trifari

[57] ABSTRACT

An anti-lock brake system for a wheeled vehicle which includes a control element for varying brake pressure and a damper piston arranged in a fluid cavity and coacting with the control element for regulating the movement of the control element during the anti-lock cycle. The dampened motion of the control element will effectuate a rapid initial and more gradual final rate of re-application of the brake pressure.

6 Claims, 5 Drawing Figures

INVENTOR.
DENIS SHARP

ANTI-LOCK BRAKE SYSTEMS

This application is a continuation of Ser. No. 771,591, filed Oct. 29, 1968, now abandoned.

This invention relates to anti-lock brake systems for wheeled vehicles, i.e. systems designed to improve braking performance by releasing a wheel brake automatically if the wheel tends to lock on a slippery surface and then permitting further braking action without the need for any change in the action of the driver. Such systems can be successful in reducing the risk of skidding due to wheel lock and maintaining directional control and can also reduce braking distances.

In one known hydraulic system the fluid must be pumped continuously so as to supply circulation of oil to the brake, and the anti-lock control device by-passes some of the fluid from the brake cylinder when it is necessary to relieve the pressure therein. However, the continuously pumped supply of oil is difficult and expensive to achieve on a motor vehicle.

There are other anti-lock systems which have been designed for use with hydraulic brake apparatus of the master-cylinder type, and examples of such anti-lock systems are described in British Pat. Spec. No. 1,101,078.

Such systems employ a wheel speed sensor and associated actuator which do not form an integral part of the system and may be of known type. The actuator is, typically electro-magnetically controlled. The sensor may be associated with the wheel as a deceleration sensor which applies signals to the electro-magnet via a suitable signal processing circuit. The signal processing can be done in various ways and according to various criteria. One simple criterion (though not necessarily the ideal one) is for the sensor signals to be rendered effective or passed to the electro-magnet only when the sensor registers a wheel deceleration which exceeds a predetermined value. This can readily be done with an electro-magnetic sensor in the form of a generator whose output has a voltage which is a function of deceleration, and a processing circuit which comprises a voltage treshold detector of known type followed by a suitable amplifier. Since such circuit elements are well known in the art, more detailed examples are not considered necessary.

The signal processing can be done electrically by circuit means interposed between the sensor and the electro-magnetic control, and for this reason it is unusual to regard such processing as part of the actuator, still less as part of the mechanical (e.g. hydraulic) brake control means (in the usual mode of operation the "processing" of the signals is the conversion from initial sensor or wheel speed information to a signal representing simply the required "on" and "off" periods of the anti-lock action).

In the present invention the processed signals determine the instants when anti-lock (e.g. brake release) action is initiated, and to this extent it corresponds to the conventional mode of operation. However, the invention departs from the simple mode of operation out-lined above in that, although the instant of cessation of anti-lock action (i.e. the start of the reapplication of the brake) may also be determined by the processing means, the actual mechanical reapplication of the brake is considerably influenced by means provided in accordance with the invention.

The invention provides an anti-lock brake control system for a wheeled vehicle which system comprises a movable anti-lock control element the position of which can be varied in order to cause brake pressure variation, means for moving said control element to an anti-lock position in response to locking or excessive deceleration of a wheel, means for subsequently causing brake reapplication by moving said element relatively rapidly in the reverse direction to a position corresponding to an intermediate value of the brake pressure and then continuing said movement more slowly until said wheel starts again to lock or to undergo excessive deceleration, and means for causing said intermediate value in successive cycles to tend towards an optimum value (as herein defined) for the particular road surface.

The said optimum cannot be defined exactly and it is not critical. However, it can be defined in practical terms as a brake pressure which can just be tolerated without causing locking of the wheel on the particular road surface.

Preferably the change from rapid to slow movement of the control element is caused by a damper element which is free to travel at an independent rate during each period of anti-lock action. These two elements can be said to further process the basic "lock-unlock" information already received from the normal processing arrangement in such a way as to modify the control of brake reapplication to best suit the particular existing road conditions. For this reason said elements and associated means can be referred to as a "combined actuator and control" mechanism, or briefly as an "actuator".

Many anti-lock control systems employ a mechanical actuator which, should a wheel tend to lock, will reduce brake fluid pressure to a value which will allow the wheel to accelerate again and is also adapted to re-apply the pressure to the initial locking value after anti-lock action.

In a simple system the pressure is reduced to a value which will prevent the wheel locking or which will allow it to be released if it has already locked. The mechanical actuator can be arranged so that it either re-applies the brake (1) quickly up to the original pressure, or (2) re-applies the brake slowly towards the original pressure. The resultant effects will now be described for these two cases.

Case (1)

The first case is satisfactory for a good surface where the brake pressure needed is only slightly below the actual pressure applied by the driver. Under these circumstances the wheel tends to repeatedly go through the point of maximum adhesion.

On a poor surface, however, the brake pressure needed may be considerably below the actual pressure applied and, with an actuator which re-applies the brake quickly, the wheel will be held for most of the time at, or too close to, the locked condition; this gives poor directional control and braking which is below the maximum possible.

Case (2)

If the actuator is arranged so that it applies the brakes slowly up to the original pressure, it will leave the wheel practically unbraked for most of the time on a good surface. This is due to the fact that a very low pressure may be required to free the wheel (because of hysteresis) and the subsequent slow pressure rise results in late re-braking.

On a poor surface the pressure needed to lock the wheel can be small compared to the pressure applied to the driver. In this case the slow application of the brake gives the wheel time to accelerate to the point of maximum adhesion before full locking pressure is applied. The result is directional control and braking which can be regarded as good when related to a bad road surface.

From the above two extremes it can be deduced that an ideal system would be one which will automatically adjust its performance to suit the various surface conditions and the applied brake pressure and a system according to the present invention can provide such a performance.

When the actuator is energized it reduces the brake pressure to an unlocking level $p_1$ at which the wheel accelerates again. It then re-applies the pressure rapidly to an intermediate value $p_2$ which is (or should soon become) slightly less than the original pressure. It should then increase the pressure relatively slowly to ensure that the wheel will eventually approach lock. If in fact the intermediate ($p_2$) pressure is still above the locking pressure ($p_3$) then the wheel will lock again but not so rapidly as it did the first time since the excess pressure is not so great. This cycle is repeated until the pressure is applied rapidly to an intermediate value just below the locking pressure, subsequently rising slowly to locking pressure; it is then reduced when the wheel locks again. This mode ensures maximum braking throughout the cycle and reduces the "surging" which is typical of a vehicle fitted with a simple conventional system.

Figure 3:
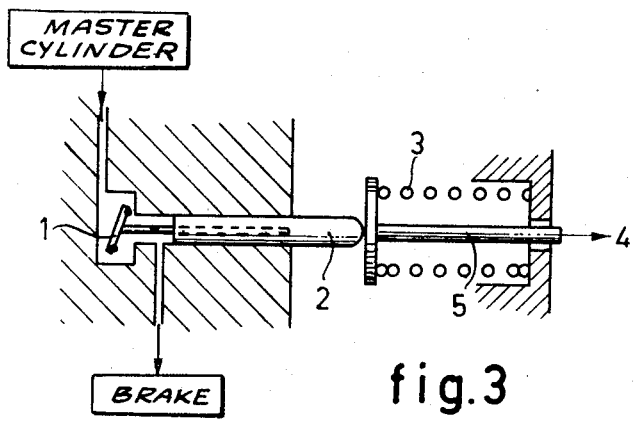
FIG. 3 shows diagrammatically a simple actuator and FIG. 4 shows simple additional means enabling it to operate in the sophisticated mode outlined above in accordance with the invention.

A typical simple actuator which is not part of the invention will now be described with reference to FIG. 3.

For normal braking operation there exists a fluid path from the master cylinder to the brake via flap valve 1. The anti-lock control element is a piston 2 which controls said valve and the brake pressure. Spring 3 is sufficiently strong to prevent valve 1 from closing due to master cylinder pressure on piston 2 until an anti-lock force 4 is applied to an auxiliary control element 5. Element 5 could form part of piston 2 but is preferably separate.

When this control force is present it causes the head of element 5 to compress spring 3 and piston 2 is forced to the right under the influence of the brake pressure thereby closing valve 1. Further movement of piston 2 which thus separates from valve 1 then displaces fluid from the brake thereby releasing the latter. The consequent removal of force 4 allows the spring 3 to force fluid back into the brake and open valve 1.

Figure 4:
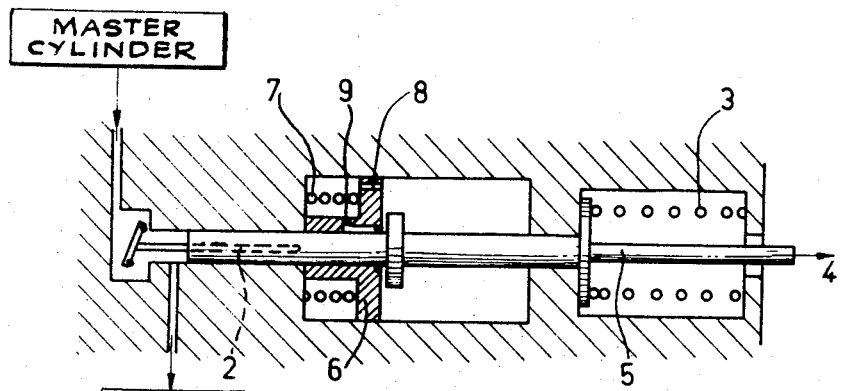

In order to fully understand the invention as applied to this simple actuator a corresponding embodiment of the invention will now be described with reference to FIG. 4.

When force 4 is applied to control element 5, piston 2 follows it and is forced to the right as before and fluid is removed from the brake. However, this system also includes a damper piston 6 in a cavity filled with fluid. During the time that piston 2 is not restraining damper piston 6, the latter is moved independently to the right by a spring 7 at a rate determined by said spring 7 and by restriction of fluid flow caused by orifices 8 and 9. Orifice 9 is controlled by a ring seal valve provided (as shown) on the piston 2 and it permits a much weaker spring 7 to be used than would be the case if orifice 8 only were used (thus this two-orifice arrangement is desirable though not essential). Normally orifice 9 will be larger than orifice 8.

When force 4 is removed, the spring 3 forces the piston 2 back to the left rapidly until the ring seal valve on the piston 2 contacts the damper piston 6 and closes orifice 9. Thereafter the pistons 2 and 6 move slowly to the left at a rate controlled by orifice 8. The instant at which piston 2 thus meets piston 6 will depend, in each cycle, on the distance travelled (to the right) by piston 6. Since this travel is independent, the distance travelled by piston 6 will be related to the time available in each cycle and this in turn will be related to the duration of the application of the anti-lock force 4. This duration depends on the quality of the road surface and on changes in the road surface. This is illustrated by the brake pressure graphs of FIGS. 1 and 2 and the more detailed graph of one cycle given in FIG. 5 of the accompanying drawing. The brake pressure at which locking occurs on a particular surface is indicated at $p_3$ in FIG. 5 (this level varies with road surface as will be seen by comparing the locking levels in FIGS. 1 and 2). The braking action will overshoot this level $p_3$ to an extent E previously referred to as an "excess" pressure, the final pressure of the particular cycle being indicated at $p_4$.

Figure 5:
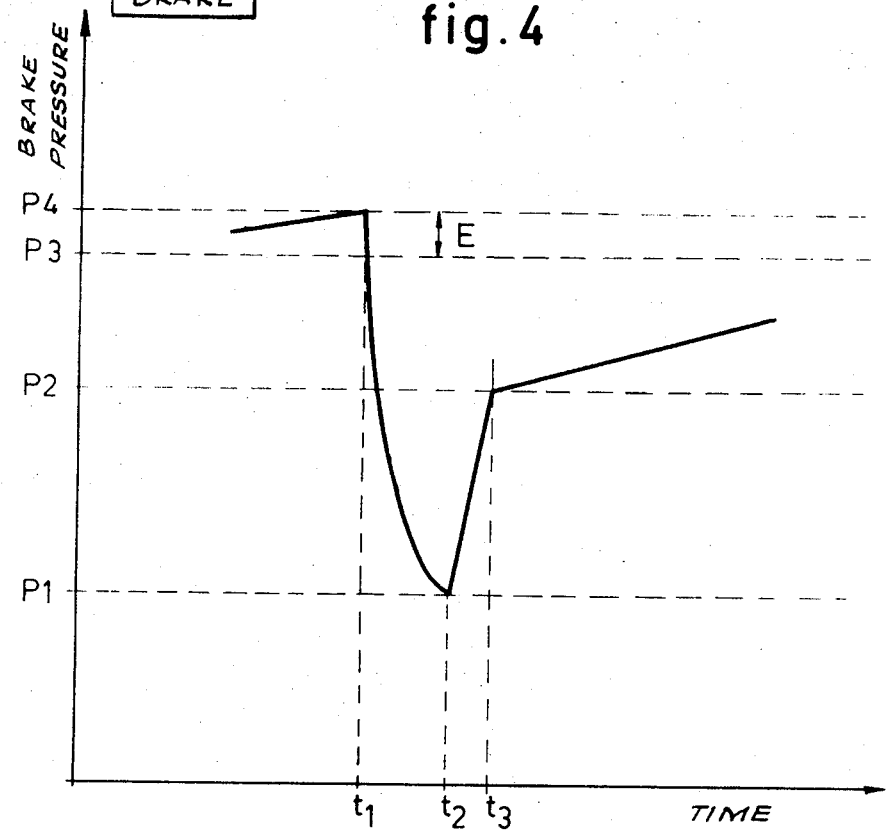
FIG. 5 shows one cycle of the brake pressure/time graph.

At this point the wheel locks (or tends to lock) and this causes the anti-lock means (not shown in FIGS. 3 and 4) to produce the force 4, the latter being applied at instant $t_1$ (FIG. 5). As a result the brake pressure drops rapidly to a value $p_1$ (FIG. 5) at which the wheel is unlocked. The greater the excess pressure E, the greater the pressure drop $p_3-p_1$ that must be obtained to release the brake and the longer the period $t_1-t_2$ during which force 4 must be maintained on element 5.

Figure 1:
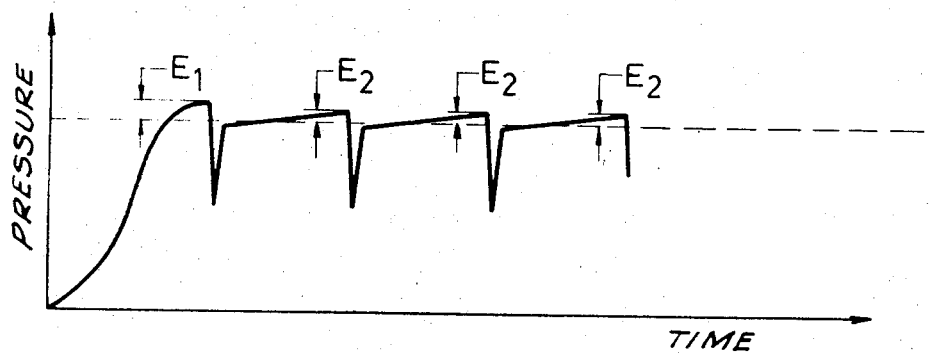
FIGS. 1 and 2 show brake pressure/time graphs of the above sequence of events for good and bad road surfaces, the excess pressure being indicated at E1, E2 etc.
Figure 2:
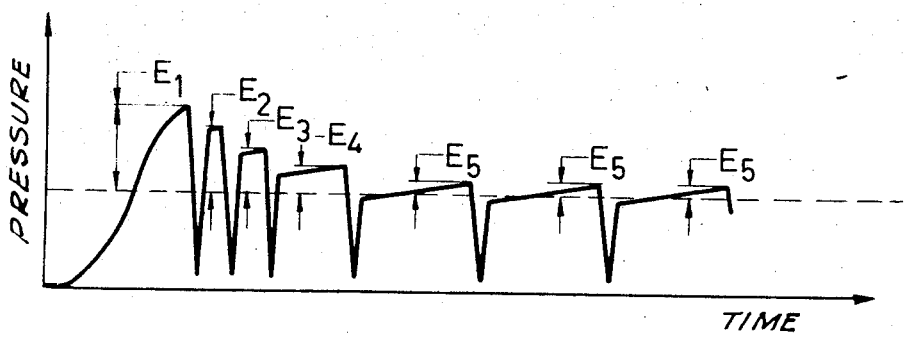

This, too, is illustrated by FIGS. 1 and 2. For a good road surface the initial excess pressure ($E_1$) is quite small, i.e. the wheel can take almost the whole of the applied pressure without skidding, and the automatic adaptive action of damper 6 is only required to reduce $E_1$ to a slightly lower value $E_2$ which may be reached e.g. after only one cycle (as shown). Conversely, on a slippery surface the large excess pressure $E_1$ of FIG. 2 has to reduced considerably, and over a number of cycles, for example from value $E_1$ to a value $E_5$ as shown. This corresponds to a long period $t_1-t_2$ (FIG. 5) and a long movement of the damper piston 6 whose final position is, in effect, a measure of the duration $t_1-t_2$.

In any event, the force 4 is removed at instant $t_2$ and spring 3 then forces piston 2 rapidly to the left thereby increasing the brake pressure at a fast rate up to an intermediate pressure level $p_2$ which is reached at instant $t_3$ (FIG. 5). This instant corresponds to the point at which piston 2 meets piston 6. Thereafter the motion of piston 2 is slowed down by the action of damper 6 and hence the continued rise in brake pressure beyond $t_3$ occurs at a slower rate. Thus it is the varying length of travel of piston 2 that adjusts the level $p_2$ from cycle to cycle until said level is at an optimum valve just below the locking level $p_3$ (see FIG. 2 for such a progressive adaptation over five cycles).

Element 5 could be attached to piston 2 or form part thereof. The main disadvantage would be that a hard application of the anti-lock force 4 at an instant of low brake pressure might cause piston 2 to suck air into the brake chamber.

The system can be applied to a pair of wheels driven by a common propeller shaft via a differential gear, in which case the wheels of the pair can share a common valve 1 and control element 2. Alternatively, the system may be one which is applied to a single wheel and comprises a valve 1 and element 2 specific to said wheel.

If the brake "fades" or the road surface improves thereby requiring further pressure, piston 2 will eventually move sufficiently to the left to open the valve 1 which will then admit more fluid to the brake.

It will be seen from FIG. 1 and 2 that the eventual brake pressure after the automatic adaptation described above will be modulated at low amplitude very close to the locking pressure apart from the short sharp decreases in pressure which will normally be needed to free the wheel due to hysteresis. Hysteresis is often particularly severe in drum brakes due to their self-serving action.

The time constants of the damper are, to some extent, governed by the rate at which the force 4 can be applied and removed. When the damper piston 6 is moving under the influence of spring 7 and control by orifices 8 and 9 its time constant must be such that the piston 6 has time to move a reasonable distance in the time that piston 2 has moved to the right and back again. The time constant of the damper piston 6 when it is being pushed by spring 3 (with control by orifice 8 only) must be longer than the above time constant but not so long that it cannot cope with brake fade or takes too long to adapt to an improved road surface.

What is claimed is:

1. An anti-lock brake control system for a wheeled vehicle comprising a movable control element for varying the application of brake pressure, means for moving the control element in a first direction to reduce brake pressure in response to wheel locking, means for moving the control element in a second direction to re-apply brake pressure, a damper element comprising a damper piston slidably mounted in a fluid filled chamber for cooperation with said control element so as to regulate the rate of movement of the control element in the second direction so that the initial movement is at a more rapid rate than the final movement, and effectuating independent rates of movement of the control element during brake re-application, said piston defining at least one orifice therethrough providing a passage for the fluid and permitting dampened motion of said piston in both directions of travel, and spring means for urging the piston toward one end of the chamber.

2. An anti-lock brake control system as claimed in claim 1 wherein the damper piston has two orifices, one of which is sealed when the control element coacts with the damper piston during brake re-application.

3. An anti-lock brake control system as claimed in claim 2 wherein the damper piston is arranged concentrically around the control element and extends beyond the fluid chamber and said control element is adapted for movement in a direction parallel to the direction of movement of the damper piston.

4. An anti-lock brake control system as claimed in claim 3 further including spring means for urging the control element in the second direction.

5. An anti-lock brake control system as claimed in claim 4 further including a valve element operated by the control element for varying master cylinder pressure to one or more brake cylinders.

6. An anti-lock brake control system for a wheeled vehicle comprising a housing, a fluid path from a master cylinder to the vehicle brake cylinder passing through said housing, a valve movably mounted within said fluid path for opening and closing said path to thereby allow and prevent fluid and pressure to be applied to said brake cylinder, a piston slidably mounted within said housing having said valve attached at one end thereof, spring means acting on the other end of said piston for urging said valve to remain in the open position, control means acting on said other end of said piston for urging said piston against the action of said spring to thereby allow said valve to close the fluid path in response to the pressure from said master cylinder when said wheel is in a locked condition so as to reduce brake fluid and brake pressure to said brake cylinder so as to release said brake, a damper element slidably mounted on said piston in a fluid chamber for cooperative engagement and travel with said piston so as to regulate the rate of movement of said piston so that the initial movement is at a more rapid rate than the final movement of said piston, said damper element having a pair of orifices for dampening the movement thereof, one of said orifices being closed when said dampening element is in cooperative engagement with said piston, and biasing means engaging said dampening element for dampening in cooperation with one of said orifices the travel of said dampening element in one direction, said pair of orifices dampening the movement of said dampening element in the other direction, whereby said valve will be cyclically opened and closed during a wheel locking condition so that the brake pressure applied to brake cylinder will increase and decrease until an optimum pressure value is reached, said damper element travelling a successively decreasing distance with successive cycles until said optimum pressure value is obtained.

* * * * *